US009704375B2

(12) United States Patent
Kore

(10) Patent No.: US 9,704,375 B2
(45) Date of Patent: Jul. 11, 2017

(54) MULTI-CHANNEL PUBLIC ANNOUNCEMENT AND VOICE ALARM SYSTEM ARCHITECTURE TO SUPPORT ADDRESSABLE DEVICES, WIRELESS EXPANSION AND INTERCOM

(71) Applicant: Honeywell International Inc., Morristown, NJ (US)

(72) Inventor: Vinayak Sadashiv Kore, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/584,010

(22) Filed: Dec. 29, 2014

(65) Prior Publication Data
US 2016/0189525 A1 Jun. 30, 2016

(51) Int. Cl.
G08B 13/00 (2006.01)
G08B 25/00 (2006.01)
G08B 25/08 (2006.01)
H04L 12/413 (2006.01)

(52) U.S. Cl.
CPC ........... *G08B 25/007* (2013.01); *G08B 25/08* (2013.01); *H04L 12/413* (2013.01); *G08B 25/004* (2013.01)

(58) Field of Classification Search
CPC .... G08B 25/007; G08B 26/008; G08B 25/08; H04L 12/413; A01K 11/008
USPC ................................ 340/413, 524, 541–543
See application file for complete search history.

(56) References Cited

U.S. PATENT DOCUMENTS

| | | | | |
|---|---|---|---|---|
| 4,610,012 A | * | 9/1986 | Terada | G01R 31/2829 340/521 |
| 6,097,288 A | * | 8/2000 | Koeppe, Jr. | G08B 25/10 340/286.11 |
| 2008/0130673 A1 | * | 6/2008 | Cregg | H04B 3/542 370/432 |
| 2008/0303661 A1 | * | 12/2008 | Chick | G08B 13/19 340/541 |
| 2009/0189981 A1 | * | 7/2009 | Siann | H04N 7/183 348/143 |
| 2013/0336292 A1 | | 12/2013 | Kore et al. | |

FOREIGN PATENT DOCUMENTS

WO  WO 2006/087566 A1  8/2006

OTHER PUBLICATIONS

Extended European search report from corresponding EP patent application 15200290.3, dated May 9, 2016.

* cited by examiner

*Primary Examiner* — Qutbuddin Ghulamali
(74) *Attorney, Agent, or Firm* — Husch Blackwell LLP

(57) ABSTRACT

An apparatus is provided that includes a security system that protects a secured geographic area, an audio annunciator of the security system, a pair of conductors that connects the audio annunciator to a control panel of the security system, wherein the pair of conductors supplies power to the audio annunciator, and a transceiver of the audio annunciator that exchanges messages with the control panel under a time division multiple access (TDMA) format through the pair of conductors, wherein the audio annunciator receives streaming audio messages from the control panel through the pair of conductors.

18 Claims, 6 Drawing Sheets

MULTI-CHANNEL PUBLIC ANNOUNCEMENT AND VOICE ALARM SYSTEM ARCHITECTURE TO SUPPORT ADDRESSABLE DEVICES, WIRELESS EXPANSION AND INTERCOM

FIELD

This application relates to security systems and, more particularly, to communication devices used within security systems.

BACKGROUND

Systems are known to protect people and assets within secured areas. Such systems are typically based upon the use of one or more sensors that detect threats within the secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets and/or people within a secured area. In the case of intruders, sensors may be placed and used in different areas based upon the different uses of the secured space.

In most cases, sensors are connected to a local control panel. In the event of a threat detected via one of the sensors, the control panel may sound a local audible alarm. The control panel may also send a signal to a central monitoring station.

In addition to a local alarm, it may be necessary to notify and guide occupants out of the secured space in the event of an emergency. In this case, a public address or announcement system may be incorporated into or used in conjunction with the security system.

While security and fire systems work well, they are sometimes expensive to set up and use, especially when the system covers a large area and a large numbers of sensors and audio warning devices are necessary. Accordingly, a need exists for better methods of expediting such processes.

DETAILED DESCRIPTION

Figure 1:
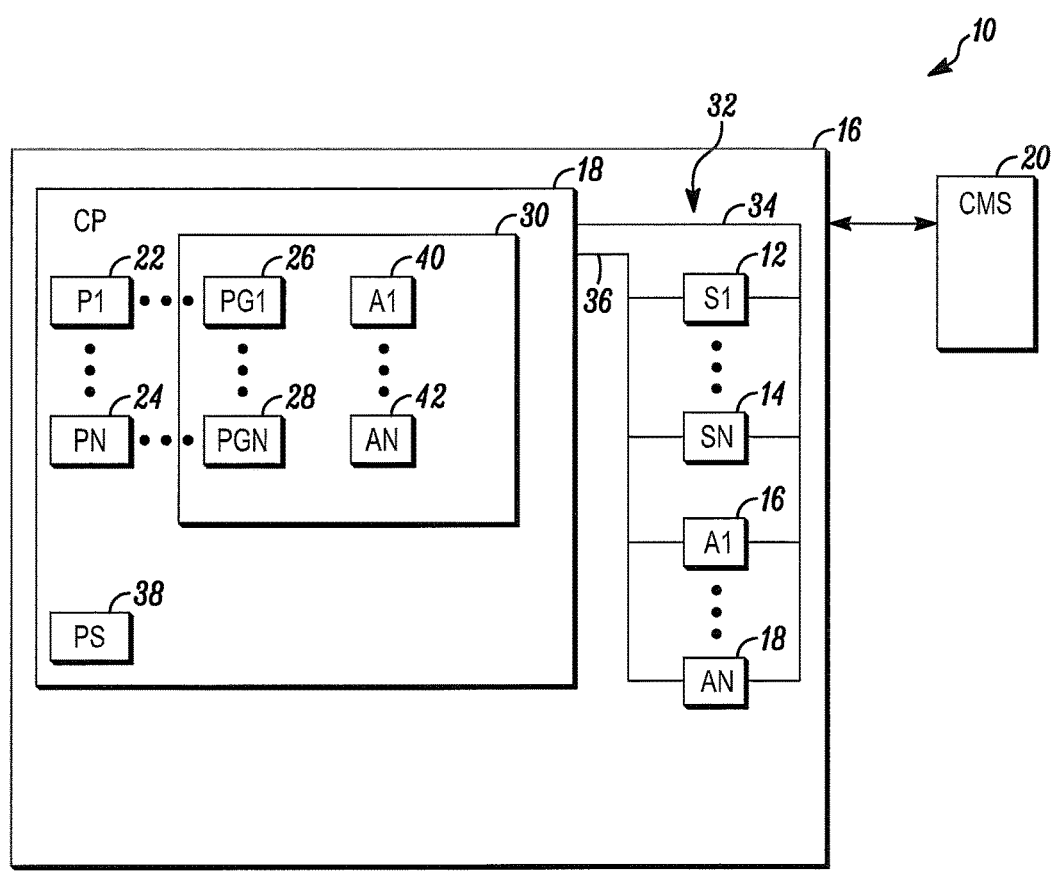
FIG. 1 is a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiment illustrated.

FIG. 1 is a simplified block diagram of a security system 10 shown generally in accordance with an illustrated embodiment. Included within the security system area number of sensors 12, 14 that detect threats to people or assets within a secured area 16. Also included within the secured area are a number of annunciators 16, 18 that provide visual and/or audio alerts to human occupants of the secured area.

The sensors may be based upon any of a number of different types of technologies. For example, some of the sensors may be limit switches placed upon the doors and/or the windows providing entry into and egress from the secured area. Other ones of the sensors may be passive infrared (PIR) detectors that detect intruders within an interior of the space. Still other ones of the detectors may be closed circuit television (CCTV) cameras with motion detection capability.

Similarly, the annunciators may be visual devices, such as strobe lights. Alternatively, the annunciators may be audible devices (speakers) that may emit predetermined noises such as spoken words.

The sensors are monitored by a control panel 19. Upon detecting activation of one of the sensors, the control panel may compose and send an alarm message to a central monitoring station 20. The control panel may also sound a local alarm by activating one of the annunciators.

Included within the control panel and in each of the sensors and the annunciators may be one or more processor apparatuses (processors) 22, 24 each operating under control of one or more computer programs loaded from a non-transitory computer readable medium (memory) 30. As used herein, reference to a step performed by a computer program is also reference to the processor that executed that step.

The sensors and/or annunciators are connected to the control panel through use of a respective transceiver 44 through a wired communication system 32. The wired communication system is based upon the use of a pair of electrical conductors 34, 36 that interconnects each of the sensors and/or annunciators with the control panel.

The pair of electrical conductors may supply power to the sensors and/or annunciators. Under one illustrated embodiment, the pair of conductors may receive power from a power supply 38. Power supplied to the sensors and/or annunciators from the power supply may be direct current (dc) or alternating current (ac).

Figure 2:
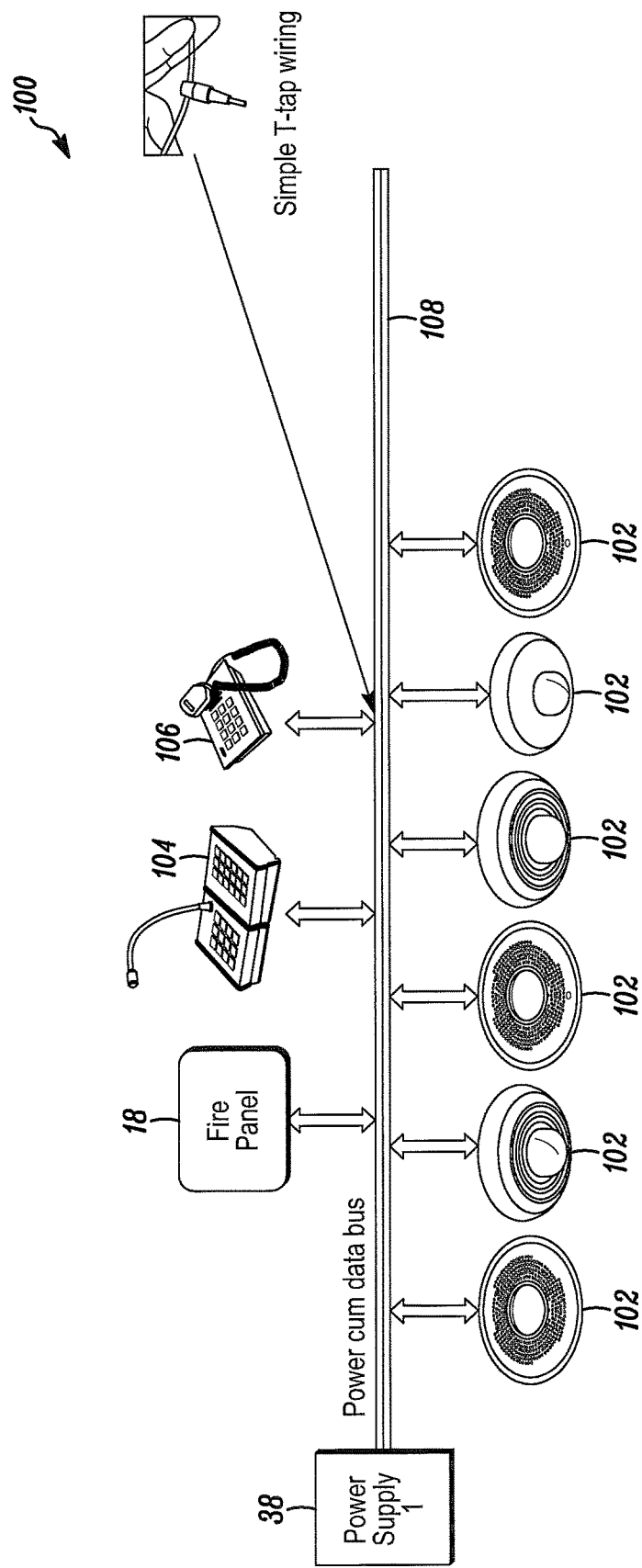
FIG. 2 is a simplified block diagram of a wired communication system used by the security system of FIG. 1.

FIG. 2 depicts a simplified connection diagram 100 of the wired communication system of FIG. 1. In FIG. 2, a number of devices 102 are shown that each incorporate a sensor and/or an annunciator and are shown connected to only one bus 108 (i.e., conductors 34, 36) via a simple T-tap connection. A central paging console 104 is also shown connected to the bus. Remote paging consoles 106 may also be connected to the bus.

The wired communication system operates under a time division multiple access (TDMA) format. Each of the sensors and annunciators (devices) has a unique system address saved within a memory of the respective sensors and annunciators and within the control panel.

Some or all of the annunciators are self-amplified speakers. In the event of an alarm, an audio processor may determine the type of alarm, retrieve an audio message from a corresponding audio file 40, 42, and send the contents of the audio file to one or more speakers. The sending of audio information may be under an appropriate streaming format. Streaming may be implemented using power line carrier techniques.

Under one embodiment, streaming may be accomplished via a repeating TDMA superframe. One slot of the TDMA superframe may be used by the control panel to synchronize each connected device to the superframe. For example, the slot may be used by a synchronization processor to transmit a synchronization packet to each sensor and annunciator. The synchronization packet may identify the security system and features of the superframe. For example, the synchronization packet may identify one or more access request slots that may be used by sensors and/or annunciators to transmit a channel request to the control panel.

Upon activation, a transceiver within each of the sensors and/or annunciators may monitor the pair of conductors for the synchronization packet. Upon receipt of the synchronization packet, the device may decode the synchronization packet and determine the appropriate course of action. For example, the device may transmit a registration request to the control panel. In response, the control panel may authenticate the device and assign the device to specific slot(s) of the superframe designated for use by the device for communicating with the control panel.

Alternatively, the control panel may authenticate and periodically poll the devices within a specific slot assigned for that response. Other slots may be allocated for transmitting alarm messages from one or more of the devices to the control panel between polling intervals.

Alternatively, the control panel may divide the superframe via the synchronization packet into uplink and downlink slots, perform polling on a regular basis, and allow random access on at least some of the slots of the superframe on an as-needed basis. These slots may be used, for example, by any registered device under a carrier sense multiple access and collision avoidance (CSMA/CA) format.

The protocol used for sending voice information to the respective speakers supports addressing each device with a specific identifier. The range of address that may be used is very large and enables thousands of devices to be connected to a single bus so that each device is individually addressed via the device's assigned address. The throughput offered by this addressing scheme is sufficient to implement multi-channel voice streaming where a different voice message may be addressed to each speaker. Due to the high throughput, the latencies on the network are very small and are well within the regulatory requirements needed to obtain intelligibility in the quality of voice.

Figure 3:
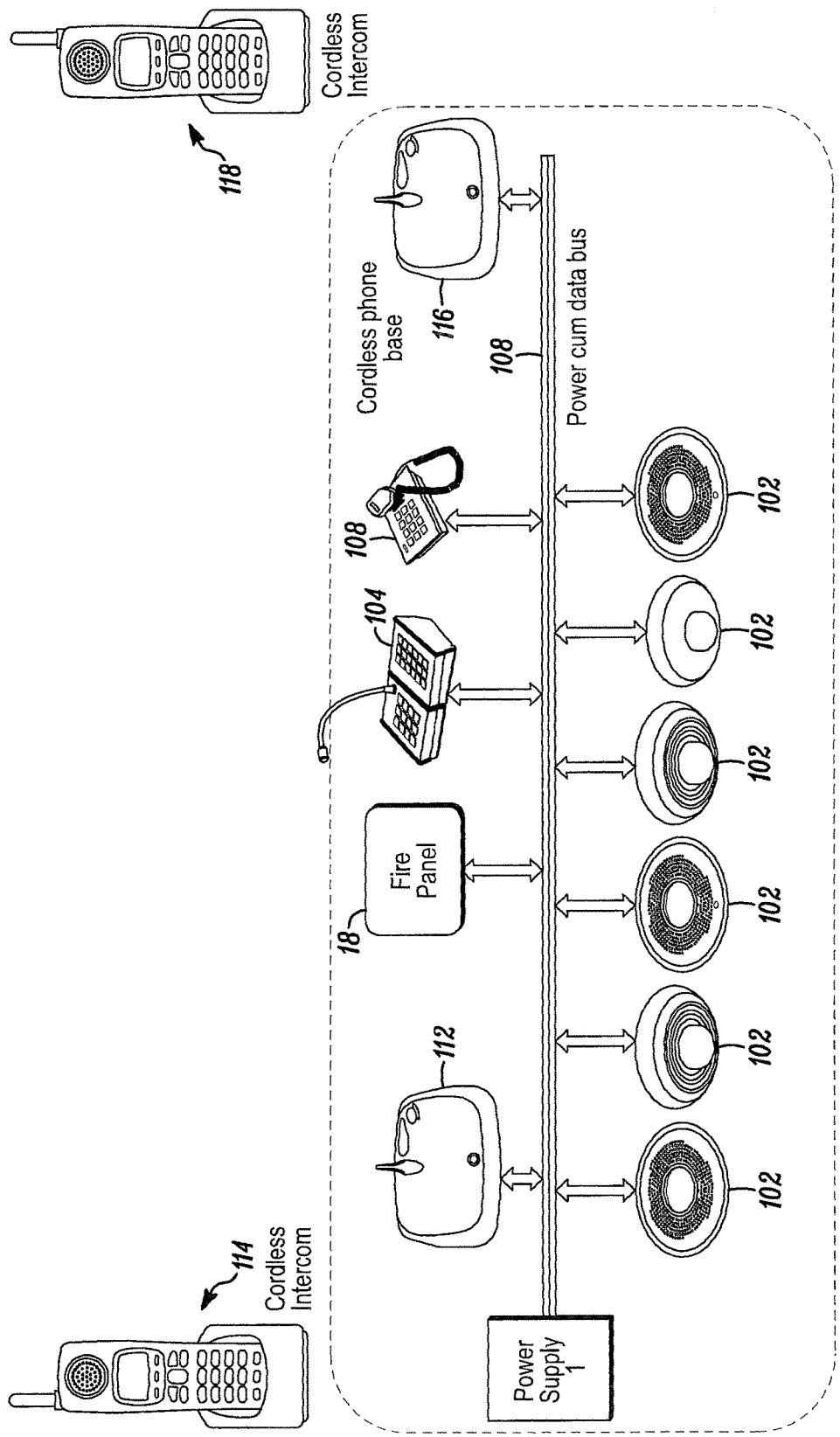
FIG. 3 is a block diagram of the wired communication system of FIG. 2 under an alternative embodiment.

Other channel access techniques, such as those used in power line carrier applications to reduce collisions, operate to impact the throughput when multiple devices simultaneously attempt to transmit. For example, FIG. 3 is a simplified wiring diagram of the wired communication system of FIG. 1. As shown, the annunciators may also include devices for two-way voice messaging between cordless phone bases 112, 116 and cordless intercoms 114, 118. In this case, the implemented TDMA scheme improves channel access and throughput versus the capacity of conventional networks.

Figure 4:
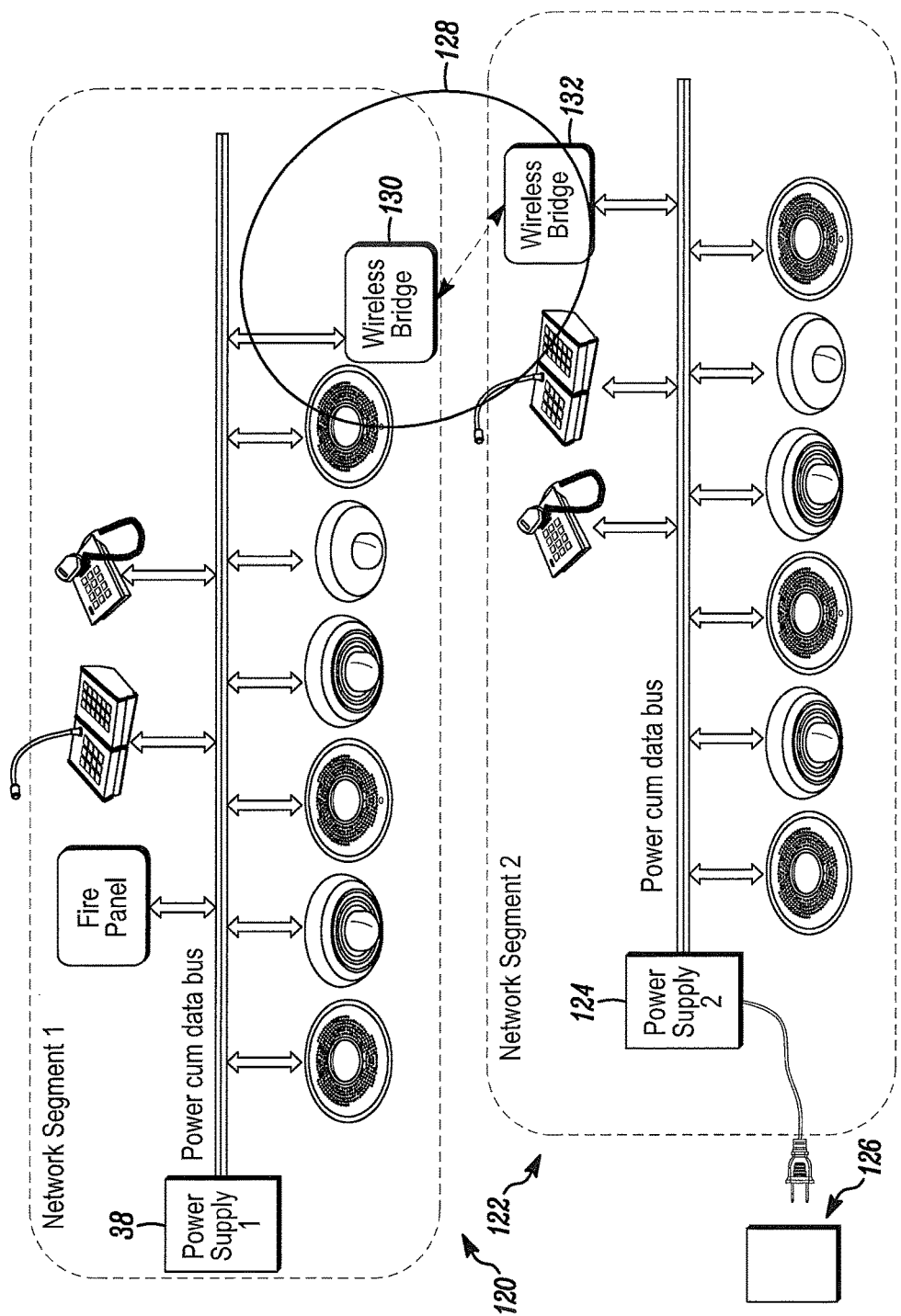
FIG. 4 is a block diagram of a wired communication system used by the security system of FIG. 1 and including different segments.

The power carrying capacity of the pair of wires defines the gauge of the wire and of the cost. With wires that are used in conventional devices, the number of devices would be limited to a few tens due to the power carrying limitations of the wires. To achieve higher capacity, multiple network segments 120, 122 may be used (as shown in FIG. 4). Each segment (e.g., segment 122) may include a power supply 124 that separately receives power through a power line socket 126 available nearby. These segments exchange data with each other using wireless communication 128 based upon a pair of wireless transceivers 130, 132. The wireless interconnectivity is monitored (e.g., using polling) and trouble messages are generated via a monitoring processor if the connection fails. The wireless connection is redundant so as to obtain class A operation. Alternatively, local data wiring, such as a cross-cabled Ethernet connection over a short distance, may be used to connect the segments of the wired communication network.

To further enhance capacity of any given device or network, each speaker (annunciator) may be powered using rechargeable batteries and/or super capacitors. The power provided by the batteries is sufficient for a few announcements while the wiring recharges the batteries or the capacitors between announcements. While this scheme can be used for infrequently streaming systems, such as voice alarms, it can be supplemented by other local sources of power for frequently streaming applications, such as paging and background music.

Figure 5:
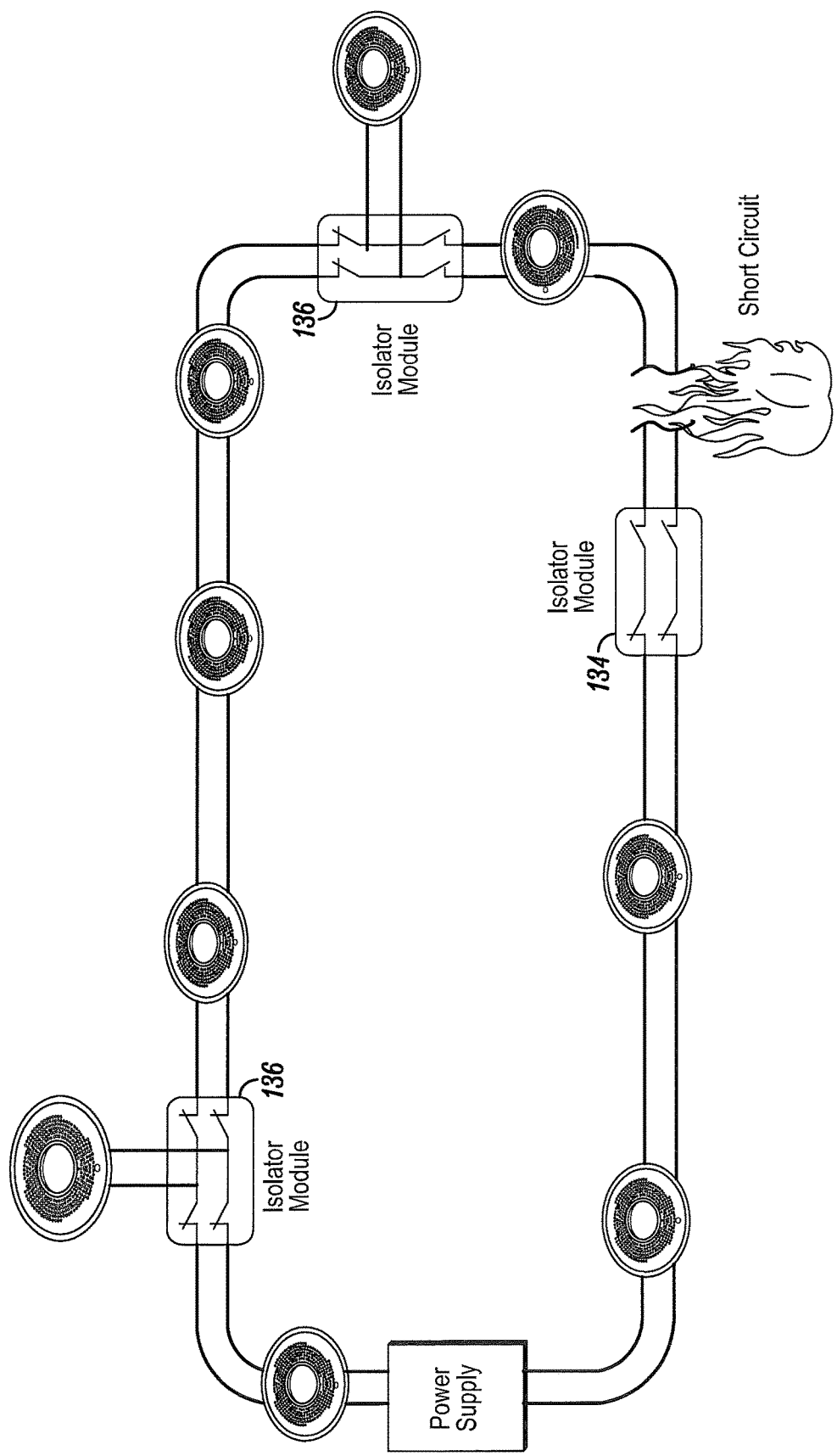
FIG. 5 is a block diagram of a wired communication system used by the security system of FIG. 1 and including redundant segments.

Under another illustrated embodiment, the power line wiring of the pair of conductors is extended into a redundant loop (as shown in FIG. 5) to obtain redundancy similar to fire loops. A processor associated with each power supply monitors the connections and energizes an isolator module 134, 136, 138 on the other side of the loop in case one portion of the loop breaks or is damaged by fire or otherwise.

Periodic health checks are implemented via a monitoring processor provided for each speaker that monitors the speaker's connection and device health status in response to polling performed by other processors. A trouble message is generated if any device drops or reports device health issues.

Figure 6:
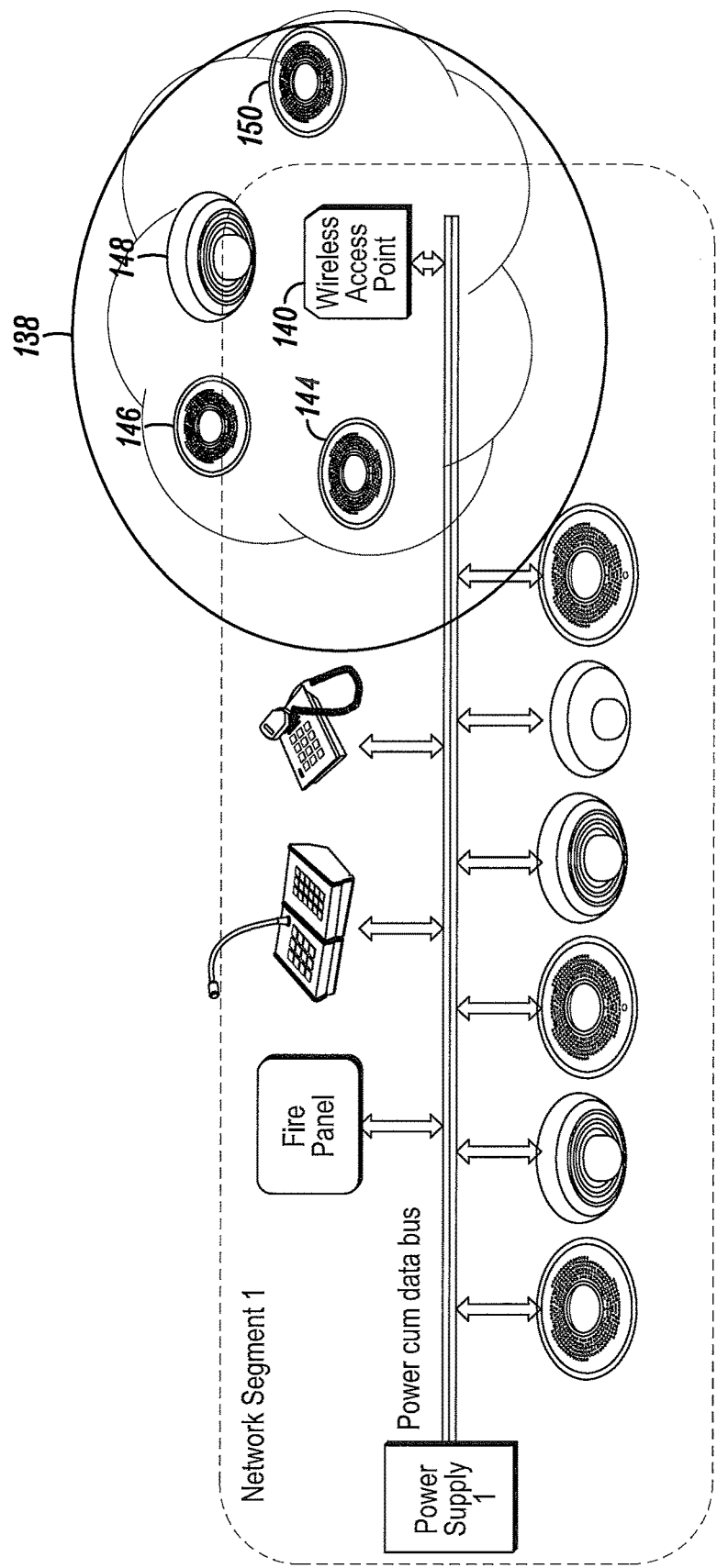
FIG. 6 is a block diagram of a wired communication system used by the security system of FIG. 1 and including a streaming transceiver.

To reduce wiring costs further in infrequent streaming applications, wireless stream broadcasters (transceivers) 140 are deployed on the power wire at appropriate distances (as shown in FIG. 6). These broadcasters stream audio to nearby wireless battery operated speakers 144, 146, 148, 150 having their own corresponding wireless transceiver. This point to multipoint local streaming mode of operation needs less bandwidth as compared to wireless mesh systems that are often managed through crowded ISM bands. The battery operated speakers are monitored through the broadcasting transceiver using status request messages and wireless health messages transmitted in response to the status query. The battery operated speakers are optimized to sleep for a maximum time period when there is no steaming in progress.

In general, the system includes a security system that protects a secured geographic area, an audio annunciator of the security system, a pair of conductors that connects the audio annunciator to a control panel of the security system, wherein the pair of conductors supplies power to the audio annunciator, and a transceiver of the audio annunciator that exchanges messages with the control panel under a time division multiple access (TDMA) format through the pair of conductors, wherein the audio annunciator receives streaming audio messages from the control panel through the pair of conductors.

Alternatively, the system includes a security system that protects a secured geographic area, the security system having a plurality of sensors of the security system that detects threats within the secured geographic area, a plurality of audio annunciators of the security system that provides an audio warning of threats to persons within the secured geographic area, a pair of conductors that connects the plurality of audio annunciators to a control panel of the security system, wherein the pair of conductors supplies power to the plurality of audio annunciators, and a respective transceiver of each of the plurality of audio annunciators that exchanges messages with the control panel under a time division multiple access (TDMA) format through the pair of conductors, wherein the plurality of audio annunciators receives streaming audio messages from the control panel through the pair of conductors.

Alternatively, the system includes a security system that protects a secured geographic area, a control panel of the security system, the control panel having a plurality of sensors distributed throughout the secured geographic area that detects threats within the secured geographic area, a plurality of audio annunciators of the security system that provides an audio warning of threats to persons within the secured geographic area, a pair of conductors that connects the plurality of audio annunciators to a control panel of the security system, wherein the pair of conductors supplies power to the plurality of audio annunciators, and a respective transceiver of each of the plurality of audio annunciators that exchanges messages through the pair of conductors under a time division multiple access (TDMA) format, wherein the respective transceiver receives streaming audio messages from the control panel through the pair of conductors.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
a security system that protects a secured geographic area;
a first audio annunciator of the security system, wherein the first audio annunciator is assigned a first address;
a second audio annunciator of the security system, wherein the second audio annunciator is assigned a second address;
a pair of conductors that connects the first and second audio annunciators to a control panel of the security system, wherein the pair of conductors supplies power to the first and second audio annunciators; and
a respective transceiver of each of the first and second audio annunciators that exchanges messages with the control panel under a carrier sense multiple access (CSMA) format through the pair of conductors,
wherein the first and second audio annunciators receive streaming audio messages from the control panel through the pair of conductors, and
wherein the control panel transmits, through the pair of conductors, a first of the streaming audio messages to the first audio annunciator by associating the first of the streaming audio messages with the first address and a second of the streaming audio messages to the second audio annunciator by associating the second of the streaming audio messages with the second address.

2. The apparatus as in claim 1 further comprising a power supply that supplies power to the first and second audio annunciators through the pair of conductors.

3. The apparatus as in claim 1 further comprising a wireless transceiver connecting different portions of a conductor of the pair of conductors.

4. The apparatus as in claim 1 further comprising an intercom.

5. The apparatus as in claim 1 wherein the pair of conductors comprises a redundant loop.

6. The apparatus as in claim 1 wherein the control panel and the first and second audio annunciators comprise a time division multiple access (TDMA) communication system.

7. An apparatus comprising:
a security system that protects a secured geographic area, wherein the security system has a plurality of sensors that detects threats within the secured geographic area;
a plurality of audio annunciators of the security system that provides an audio warning of threats to persons within the secured geographic area, wherein each of the plurality of audio annunciators is assigned a respective unique system address by a control panel of the security system;
a first pair of conductors that connects the plurality of audio annunciators to the control panel of the security system, wherein the first pair of conductors supplies power to the plurality of audio annunciators; and
a respective transceiver of each of the plurality of audio annunciators that exchanges messages with the control panel under a carrier sense multiple access (CSMA) format through the first pair of conductors,
wherein the respective transceiver receives a respective one of a plurality of streaming audio messages from the control panel through the first pair of conductors, and
wherein the control panel transmits, through the first pair of conductors, the plurality of streaming audio messages to the plurality of audio annunciators by associating each of the plurality of streaming audio messages with the respective unique system address for a respective one of the plurality of audio annunciators.

8. The apparatus as in claim 7 further comprising a battery or a super capacitor that intermittently powers at least some of the plurality of audio annunciators.

9. The apparatus as in claim 7 further comprising a radio frequency interface that wirelessly couples a distal end of one of the first pair of conductors to a corresponding conductor of a remotely located pair of conductors.

10. The apparatus as in claim 9 further comprising a power supply located proximate the remotely located pair of conductors that receives the power from a wall outlet and supplies the power to the remotely located pair of conductors.

11. The apparatus as in claim 7 further comprising a radio frequency interface that wirelessly broadcasts streamed information to a wireless one of the plurality of audio annunciators.

12. The apparatus as in claim 7 wherein the first pair of conductors comprises a redundant loop.

13. An apparatus comprising:
a security system that protects a secured geographic area;
a control panel of the security system, wherein the control panel is connected to a plurality of sensors distributed throughout the secured geographic area that detects threats within the secured geographic area;
a plurality of audio annunciators of the security system that provides an audio warning of threats to persons within the secured geographic area, wherein each of the plurality of audio annunciators is assigned a unique address;
a pair of conductors that connects the plurality of audio annunciators to the control panel of the security system, wherein the pair of conductors supplies power to the plurality of audio annunciators; and
a transceiver within the control panel that exchanges messages, through the pair of conductors, with a corresponding transceiver within each of the plurality of audio annunciators under a time division multiple access (TDMA) format, wherein the transceiver within the control panel streams respective ones of a plurality of streaming audio messages from the control panel, through the pair of conductors, to at least some of the plurality of audio annunciators, and wherein the control panel transmits, through the pair of conductors, the plurality of streaming audio messages to the plurality of audio annunciators by associating each of the plurality of streaming audio messages with the unique system address for a respective one of the plurality of audio annunciators.

14. The apparatus as in claim 13 further comprising a synchronization processor of the control panel that synchronizes each of the plurality of audio annunciators to a repeating superframe.

15. The apparatus as in claim 13 wherein at least one of the plurality of audio annunciators comprises a speaker.

16. The apparatus as in claim 13 wherein each of the pair of conductors is divided into at least two segments, and wherein the at least two segments are connected wirelessly via a radio frequency transceiver.

17. The apparatus as in claim 13 further comprising a broadcast transceiver that wirelessly transmits one of the plurality of streaming audio messages to one of the plurality of audio annunciators.

18. The apparatus as in claim 13 further comprising a pair of audio devices that exchanges audio information with each other through the pair of conductors.

* * * * *